United States Patent
Satterfield et al.

(10) Patent No.: US 8,299,768 B2
(45) Date of Patent: Oct. 30, 2012

(54) PWM VOLTAGE CONVERTER WITH REDUNDANCY AND FEEDBACK ADJUSTMENT

(75) Inventors: Harold William Satterfield, Rockledge, FL (US); Lawrence Pearce, Palm Bay, FL (US)

(73) Assignee: Intersil Americas Inc., Milpitas, CA (US)

( * ) Notice: Subject to any disclaimer, the term of this patent is extended or adjusted under 35 U.S.C. 154(b) by 342 days.

(21) Appl. No.: 12/622,278

(22) Filed: Nov. 19, 2009

(65) Prior Publication Data
US 2010/0127680 A1 May 27, 2010

Related U.S. Application Data

(60) Provisional application No. 61/116,545, filed on Nov. 20, 2008.

(51) Int. Cl.
*G05F 1/575* (2006.01)
(52) U.S. Cl. .................. 323/282; 323/283
(58) Field of Classification Search .......... 323/222, 323/271, 272, 282, 283
See application file for complete search history.

(56) References Cited

U.S. PATENT DOCUMENTS

| | | | | |
|---|---|---|---|---|
| 5,917,719 A | * | 6/1999 | Hoffman et al. | 363/84 |
| 6,437,545 B2 | * | 8/2002 | Sluijs | 323/222 |
| 2001/0054885 A1 | * | 12/2001 | Umemoto | 323/282 |
| 2005/0151523 A1 | * | 7/2005 | Paulos | 323/282 |
| 2006/0055381 A1 | * | 3/2006 | Rice | 323/271 |
| 2006/0072351 A1 | * | 4/2006 | Go | 363/49 |
| 2006/0290332 A1 | * | 12/2006 | Condito | 323/272 |
| 2009/0296433 A1 | * | 12/2009 | Sihler et al. | 363/65 |

* cited by examiner

*Primary Examiner* — Adolf Berhane
*Assistant Examiner* — Fred E Finch, III
(74) *Attorney, Agent, or Firm* — Fogg & Powers LLC

(57) ABSTRACT

A pulse-width modulated (PWM) DC-DC converter has a multitude of redundant channels supplying PWM signals to a voter whose output voltage controls the regulated DC output voltage. To ensure that single transient events, single permanent faults, or mismatches in the electrical characteristics of the various components disposed in the redundant channels do not adversely affect the regulated DC output voltage, transitions of the PWM signal in each channel are compared to the corresponding transitions of the voter's output signal. If a PWM signal transition of a redundant channel is detected as occurring relatively earlier/later than the corresponding transition of the voter's output signal, the width of the PWM signal is increased/decreased. If a PWM signal transition of a redundant channel is detected as occurring within a predefined window of the corresponding transition of the voter's output signal, the width of the PWM signal is not changed.

20 Claims, 5 Drawing Sheets

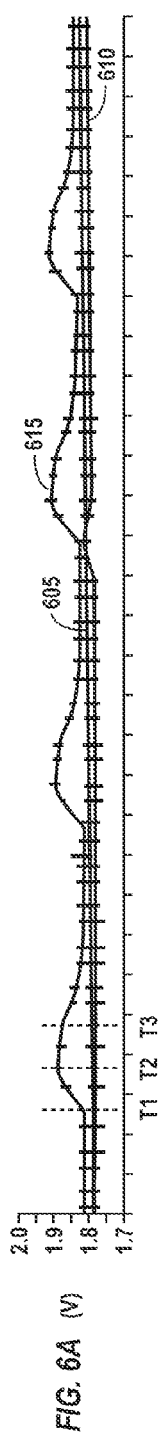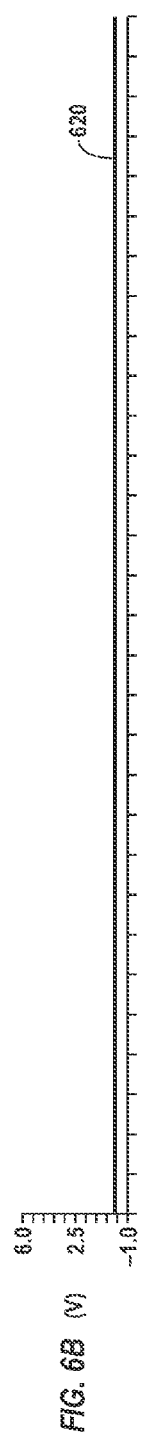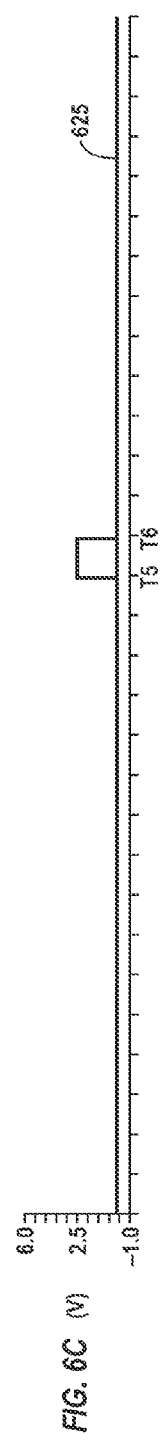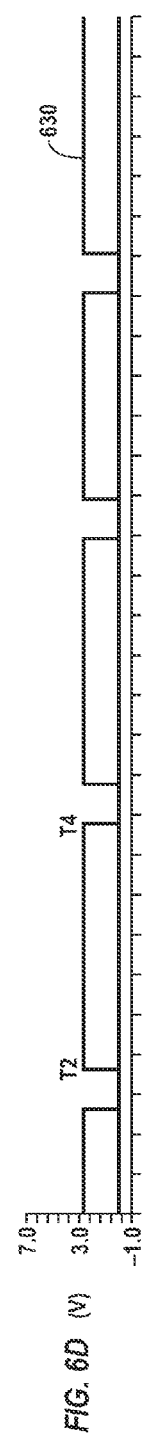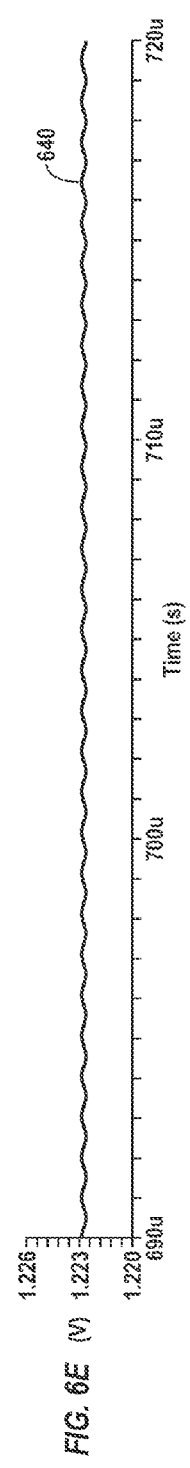

PWM VOLTAGE CONVERTER WITH REDUNDANCY AND FEEDBACK ADJUSTMENT

CROSS-REFERENCES TO RELATED APPLICATIONS

The present application claims benefit under 35 USC 119 (e) of U.S. provisional application No. 61/116,545, filed Sep. 20, 2008, entitled "PWM Voltage Converter with Transient and Permanent Fault Immunity through Redundancy and Feedback Adjustment", the content of which is incorporated herein by reference in its entirety.

BRIEF DESCRIPTION OF THE DRAWINGS

FIG. 6A shows exemplary computer simulations of the output voltages of the error amplifiers disposed in a DC-DC converter having three redundant channels, in accordance with one embodiment of the present invention.

FIGS. 6B, 6C, 6D, and 6E show exemplary computer simulations of the feedback adjust signals generated by a DC-DC converter having three redundant channels, in accordance with one embodiment of the present invention.

DETAILED DESCRIPTION OF THE INVENTION

In accordance with one embodiment of the present invention, a pulse-width modulated (PWM) DC-DC converter has a multitude of redundant channels supplying PWM signals to a voter whose output voltage controls the regulated DC output voltage. To ensure that single transient events or mismatches in the electrical characteristics of the various components disposed in the redundant channels do not adversely affect the regulated DC output voltage, transitions of the PWM signal in each channel are compared to the corresponding transitions of the voter's output signal. If the PWM signal transition of a redundant channel is detected as occurring earlier than the corresponding transition of the voter's output signal, the width of the PWM signal is increased. If the PWM signal transition of a redundant channel is detected as occurring later than the corresponding transition of the voter's output signal, the width of the PWM signal is decreased. If a PWM signal transition of a redundant channel is detected as occurring within a predefined window of the corresponding transition of the voter's output signal, the width of the PWM signal is not changed. To vary the width of the PWM pulse in each redundant channel, the result of the comparison operation is used to adjust a feedback voltage signal that represents the regulated DC output voltage. The adjusted feedback signal is subsequently compared to a reference voltage by an error amplifier. The output of the error amplifier, in turn, is used to vary the width of the PWM signal.

Figure 1:
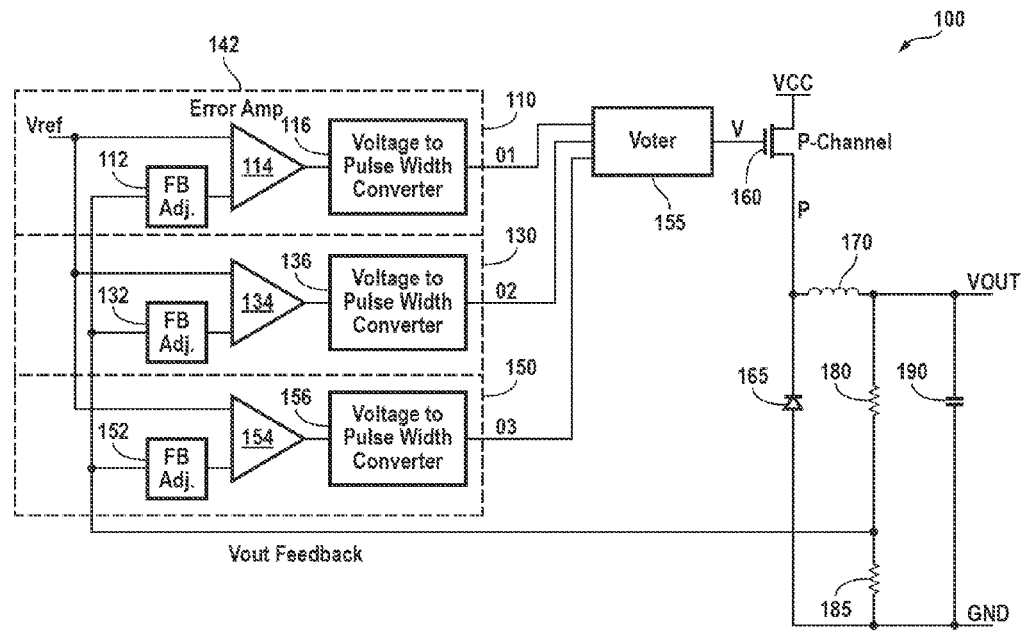
FIG. 1 is a simplified schematic diagram of an asynchronous DC-DC voltage converter having three redundant channels, in accordance with one exemplary embodiment of the present invention.

FIG. 1 is a simplified schematic diagram of an asynchronous DC-DC voltage converter 100 having three redundant pulse-width modulated (PWM) channels 110, 130 and 150, voter 155, PMOS transistor 160, inductor 170, diode 165, capacitor 190, and resistors 180, 185, in accordance with one exemplary embodiment of the present invention. Resistors 180 and 185 divide down the output voltage Vout of DC-DC voltage converter 100 to generate a feedback voltage Vout_Feedback that is applied to each of the redundant channels. Although the exemplary embodiment of the DC-DC voltage converter of FIG. 1 is shown as including only three redundant channels, it is understood that a DC-DC voltage converter in accordance with embodiments of the present invention may have more or fewer than three redundant channels. Furthermore, DC-DC voltage converters, in accordance with embodiments of the present invention and are equally applicable to synchronous DC-DC converters. As is well known, a synchronous DC-DC converter may be formed by replacing diode 165 with any electrical switch such as an N-channel transistor whose gate terminal is driven by a second voter (not shown). Similarly, device 160 is not restricted to a p-channel, as any electrical switch is applicable.

As is seen, each redundant channel includes a feedback adjust block FB_adj, an error amplifier, and a voltage to pulse converter. For example, redundant block 110 includes a feedback adjust block 112, an error amplifier 114, and a voltage to pulse converter 116. Redundant block 130 is shown as including a feedback adjust block 132, an error amplifier 134, and a voltage to pulse converter 136. Likewise, redundant block 150 is shown as including a feedback adjust block 152, an error amplifier 154, and a voltage to pulse converter 156. Voter 155 receives signals O1, O2, O3, generated respectively by redundant blocks 110, 130 and 150, and generates an output signal V representative of the majority of the input signal it receives. For example, if at least two of signals O1, O2 and O3 are logic high signals, signal V will also be a logic high signal. If, on the other hand, at least two of signals O1, O2 and O3 are logic low signals, signal V will also be a logic low signal. As is well known, PMOS transistor 160 is in a conductive state when signal V is in a logic low state. When transistor 160 is in a conductive state, node P is high at approximately VCC, diode 165 is reverse biased and the current through inductor 170 increases and VOUT increases. Assuming the current through inductor 170 is flowing from P to VOUT, when transistor 160 turns off, node P goes negative and forward biases diode 165 to maintain the current through inductor 170. The low and high pulsing of node P is filtered by the LC low-pass filter 170 and 190. The LC low-pass filter 170 and 190 set the VOUT voltage to approximately the duty cycle of the node P multiplied by VCC. The VOUT voltage is fed back to the error amplifier as signal Vout_Feedback by the resistor divider 180 and 185. Temporarily neglecting mismatches and the corresponding need for the FB Adjust blocks, the error amplifiers 114, 134, 154 amplify any difference between Vref and Vout_Feedback, and the Voltage to Pulsewidth Converters 116, 136, 156 vary node P's duty cycle as necessary to maintain Vref equal to Vout_Feedback.

Resistors 180 and 185 divide the output voltage Vout to generate a feedback voltage VOUT_Feedback that is applied to the feedback adjust blocks 112, 132 and 152 disposed respectively in redundant channels 110, 130 and 150. The feedback adjust blocks compensate for various sources of mismatch between the three redundant channels (such as the different input offset voltages of their respective error amplifiers). Each error amplifier is adapted to compare a reference voltage (Vref) to the feedback voltage it receives from its associated feedback adjust block and to modulate, in response, the pulse width generated by its associated voltage to pulse converter in order to minimize the difference between the reference voltage and the feedback voltage it receives. The feedback adjust blocks compensate for various sources of mismatch between the three redundant channels (such as the different input offset voltages of their respective error amplifiers) to keep all three redundant channels producing a similar output pulse width.

Figure 2:
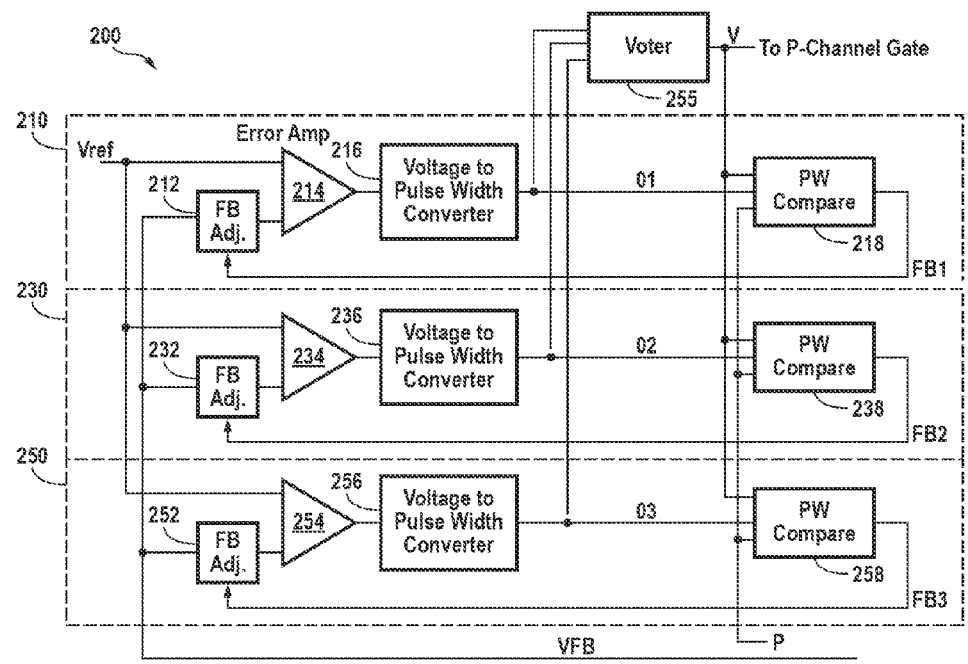
FIG. 2 is a simplified schematic diagram of a DC-DC voltage converter having three redundant channels, in accordance with another exemplary embodiment of the present invention.

FIG. 2 shows a number of blocks of a three-channel PWM DC-DC converter 200, in accordance with another exemplary embodiment of the present invention. For simplicity, the inductor, capacitor, the resistive voltage divider and the transistor of FIG. 1 are not shown in FIG. 2. PWM DC-DC voltage converter 200 is shown as including, in part, three redundant PWM channels 210, 230 and 250, and a voter 255. Although exemplary PWM DC-DC converter 200 is shown as including three redundant channels, it is understood that a PWM DC-DC converter in accordance with embodiments of the present invention may have more or fewer than three redundant channels.

As is seen, each redundant channel includes a feedback adjust block FB Adj, an error amplifier, a voltage to pulsewidth converter, and a pulsewidth compare block. For example, redundant block 210 is shown as including a feedback adjust block 212, an error amplifier 214, a voltage to pulsewidth converter 216, and pulsewidth compare block 218. Likewise, redundant block 230 is shown as including a feedback adjust block 232, an error amplifier 234, a voltage to pulse converter 236, and a PWM compare block 238.

Voter 155 generates an output signal V representative of the majority of input signals O1, O2, O3, it receives from voltage to pulsewidth converters 216, 236 and 256, respectively. As shown, signal V is applied to the PW compare blocks 218, 238 and 258 that are adapted to control the feedback signals FB1, FB2 and FB3 applied respectively to feedback adjust blocks 212, 232 and 252. Feedback adjust blocks 212, 232 and 252 are adapted to substantially equalize the duty cycles of the pulses in the three redundant channels 210, 230 and 250. For example, assume that voltage to pulse converter 216 disposed in redundant channel 210 generates a relatively long pulse width. Accordingly, compare block 218 varies the control feedback signal FB1 so that the next pulse generated by voltage to pulse converter 216 has a shorter pulse width. In other words, the PW compare block disposed in each block is adapted to determine whether the width of the pulse generated by its associated voltage to pulsewidth converter is relatively longer than, shorter than, or equal to the desired pulse width, and vary, if required, the feedback signal it generates to cause the pulse width generated within its associated channel to fall within the desired range.

The rising edges of signals O1, O2 and O3 are triggered by a common clock signal (not shown). The falling edge of each of these signals is, however, determined by the output voltage of the error amplifier associated with generating that signal. For example, the falling edge of signal O1 is triggered by the output voltage of error amplifier 214. Likewise, the falling edge of signal O2 is triggered by the output voltage of error amplifier 234, etc. Because the output voltages of the error amplifiers may vary significantly, the falling edges of signal pulses O1 may also occur at substantially different times.

As shown, each redundant channel PWM signal, i.e. signals O1, O2 and O3, is compared to the voter output signal V by the compare block disposed in the same channel. The redundant PWM signal that changes the state of the voter 255 transitions substantially at the same time as the voter, taking into account the delay across the voter. For example, assume signal O1 goes low while signals O2 and O3 remain high. Because voter 255 is a majority voter, its output will not change. Assume that after the elapse of a certain time, signal O2 also goes low. Because both O1 and O2 are low, voter 255 changes state. Accordingly, in this example, redundant channel 230 is identified as the controlling redundant channel, thus requiring no feedback adjustment. In other words, because the PWM signal of the controlling channel is substantially the same as voter 255's output signal, it does not require adjustment and thus its associated feedback adjust block feedback does not vary the feedback signal VFB representative of the output signal of the PWM DC-DC converter.

If a redundant channel PWM's pulse transitions substantially before the voter's output, the output voltage of its associated error amp is detected as being relatively low. Accordingly, the feedback adjust block disposed in that channel varies the VFB signal in a direction that causes the output voltage of its associated error amplifier to increase. Conversely, if a redundant channel PWM's pulse transitions substantially after the voter's output, the output voltage of its associated error amp is detected as being relatively high. Accordingly, the feedback adjust block disposed in that channel varies the VFB signal in a direction that causes the output voltage of its associated error amplifier to decrease. In other words, the pulse width of the channel that controls voter 255's output does not get modified, whereas the pulse width of the two channels that do not control voter 255's output may be modified.

The feedback adjustments of signal VFB are adapted to cause all three redundant paths to generate similar PWM pulse widths. Therefore, if a fault occurs within one of the redundant channels, the remaining two paths have similar PWM pulse widths and continue to control the voter's output at a similar pulse width. As described further below, the feedback adjust control signals FB1, FB2 and FB3 may vary the VFB signal applied to the feedback adjust blocks, 212, 232, and 252 respectively. Referring to FIGS. 1 and 2 concurrently, the duty cycle of signal P, generated at the drain terminal of transistor 160, is used to establish the output voltage Vout of the PWM DC-DC converter. For example, if the duty cycle of signal P is 60%, voltage Vout will be 60% of the supply voltage Vcc.

Figure 3:
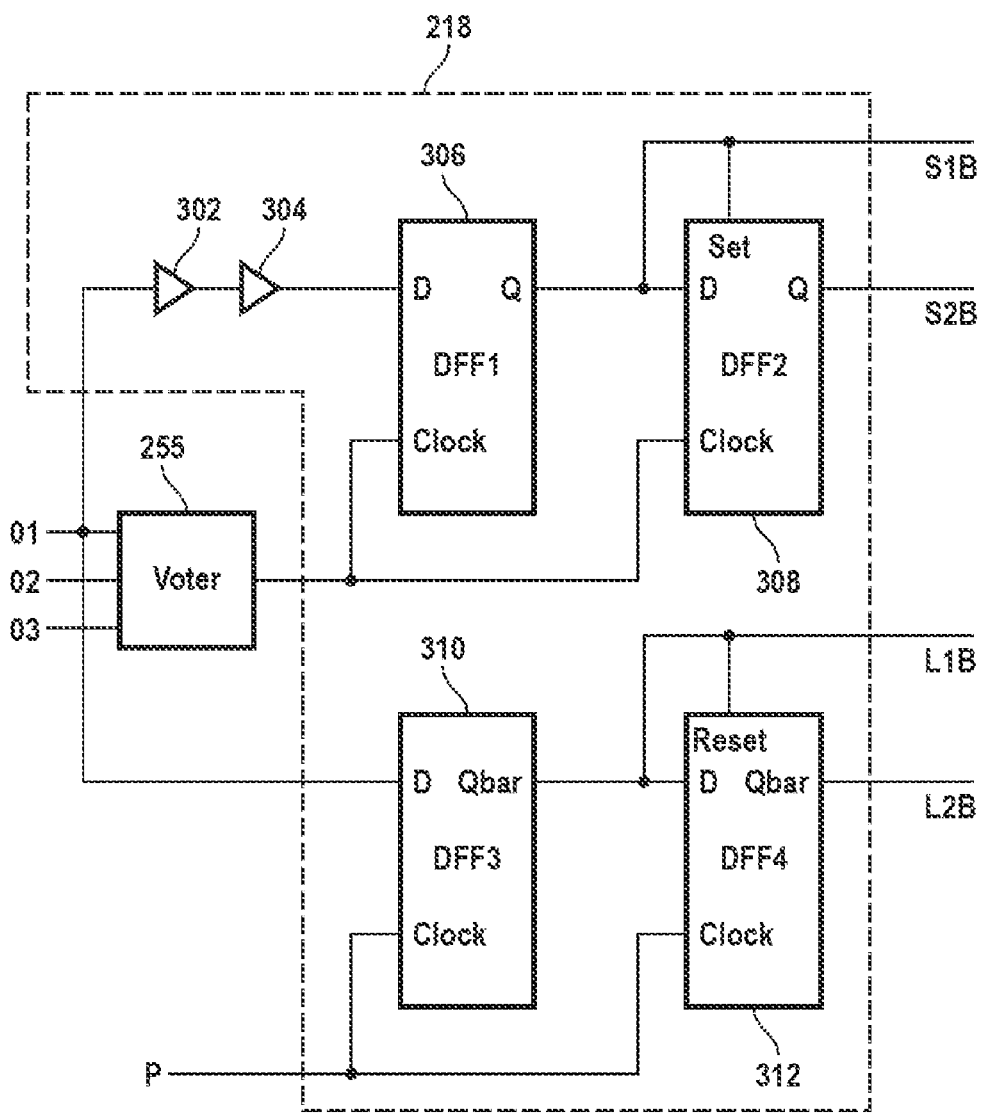
FIG. 3 is a block diagram of the PWM compare blocks in communication with the voter disposed in the DC-DC voltage converter of FIG. 2.

FIG. 3 is a block diagram of the PW compare block 218 in communication with voter 255. Although not shown, it is understood that PW compare blocks 238 and 258 are similar to and operate in the same manner as compare block 218. PW compare block 218 is adapted to determine whether the falling edge of the redundant signal O1 is relatively longer than, shorter than, or sufficiently close to voter 255's output edge, and to generate the feedback control signal FB1, which includes signals S1B, S2B, L1B and L2B, in accordance with this determination. To achieve this, the compare block also receives signal P and the output signal V of the voter. Output signals S1B, S2B, L1B, and L2B are feedback signals used in controlling the corresponding feedback adjust control block and are described in detail below. As stated above, the combination of signals S1B, S2B, L1B, and L2B—associated with redundant channel 210—forms the feedback signal FB1. The combination of signals S1B, S2B, L1B, and L2B—associated with redundant channel 230—form the feedback signal FB2. Likewise, the combination of signals S1B, S2B, L1B, and L2B—associated with redundant channel 250—form the feedback signal FB3.

As is shown, compare block 218 includes delay elements 302, 304, and flip-flops 306, 308, 310, and 312. Delay element 302 delays signal O1 by an amount substantially equal to the delay across voter 255. Delay element 304 delays the falling edge of signal O1 by an additional amount, thereby to define a window within which delays between signal O1 and the voter's output are ignored. For example, assume that the delay across delay element 304 is selected to be 15 nsec. Accordingly, any O1 signal whose falling edge is less than 15 nsec before the falling edge of the voter's output is considered as being sufficiently close to the voter's output so as not to require any adjustment in its error amplifier output voltage.

The clock input terminals of flip-flops 306, 308 are supplied by the output signal of the voter. The clock input terminals of flip-flops 310, 312 are supplied by signal P generated at the drain terminal of transistor 160 shown in FIG. 1. The data input terminal of flip-flop 306 is driven by delay buffer 304. The Q output of flip-flop 306 is coupled to the data input terminal of flip-flop 308. The data and Set input terminals of flip-flop 308 are coupled to one another. As is seen, the Q output terminals of flip-flops 306, 308 generate signals S1B and S2B described above. The data input terminal of flip-flop 310 is driven by signal O1. The $\overline{Q}$ output of flip-flop 310 is coupled to the data input terminal of flip-flop 312. The data and Reset input terminals of flip-flop 312 are coupled to one another. As is seen, the $\overline{Q}$ output terminals of flip-flops 310 and 312 generate signals L1B and L2B described above.

Feedback signal S1B's assertion indicates that the redundant PWM signal was shorter than desired during the past cycle and thus a relatively small feedback adjustment is necessary to increase the width of the PWM pulse. Feedback signal S2B's assertion indicates that the redundant PWM signal has been shorter than desired during the past two or more clock cycles and thus a significantly larger feedback adjustment is necessary. The level of the feedback signals are thus adjusted to effectuate the desired change. Signal S2B is asserted only if signal S1B is asserted. In other words, signal S2B is asserted only following two consecutive assertions of signal S1B. Signal S2B is deasserted following deassertion of signal S1B.

Feedback signal L1B's assertion indicates that the redundant PWM signal was longer than desired during the past cycle and thus a relatively small feedback adjustment is necessary to shorten the width of the PWM pulse. Feedback signal L2B's assertion indicates that the redundant PWM signal has been longer than desired during the past two or more clock cycles and thus a significantly larger feedback adjustment is necessary. The level of the feedback signals are thus adjusted to effectuate the desired change. Signal L2B is asserted only if signal L1B is asserted. In other words, signal L2B is asserted only following two consecutive assertions of signal S1B. Signal S2B is deasserted following deassertion of signal S1B. Signals L1B and L2B are not asserted when signals S1B and S2B are asserted. Conversely, signals S1B and S2B are not asserted when signals L1B and L2B are asserted. The PWM pulse width comparison is dynamic and occurs during every PWM cycle.

Assume that the delay across delay element 304 is selected to be 15 nsec. Assume further that signal O1 makes a high-to-low transition 20 nsec before the voter's output makes a high-to-low transition. When the voter's output changes, output Q of flip-flop 306, i.e., signal S1B, goes low while output Q of flip-flop 308 changes to the previous output logic state of flip-flop 306. Because the data input terminal of flip-flop 310 is at a logic low state (low) when signal P goes low, signal L1B goes high which, in turn, resets signal L2B to a high level. The low level of signal S1B indicates that the pulse width of signal O1 is too short. Accordingly, if S1B was low the previous PWM cycle, signal S2B will also be low to increase the level of the applied feedback signal.

Assume signal O1 makes a high-to-low transition less than 15 nsec before a high-to-low transition of the voter's output signal. The data input terminal of flip-flop 306 is at a high level when the voter's output changes. Therefore signal S1B goes high, which in turn, causes flip-flop 308 to be reset and signal S2B to be high. Because the data input terminal of flip-flop 310 is low when signal P goes low, signal L1B goes high which, in turn, resets signal L2B to a high level. Accordingly, no feedback adjustment is applied.

Assume signal O1 makes a high-to-low transition after a high-to-low transition of the voter's output signal. The data input terminal of flip-flop 306 is at a high level when the voter's output changes. Therefore, signal S1B goes high, which in turn causes flip-flop 308 to be reset and signal S2B to be high. As can be seen in FIG. 1, there is delay between the voter output V transition and the node P transition. If signal O1 makes its high-to-low transition before node P makes its high-to-low transition, signal L1B goes high, and resets L2B to also go high and no feedback adjustment is applied. However, if signal O1 makes its high-to-low transition after node P makes its high-to-low transition, the data input terminal of flip-flop 310 is high when signal P goes low, signal L1B goes low and the output Q of flip-flop 312 changes to the previous logic state of flip-flop 310. The low level of signal L1B indicates that the pulse width of signal O1 is too long. If the previous cycle was also too long, signal L2B will also be low to increase the level of applied feedback signal. Table I below lists the output signals of compare block 218 in response to the received input signals.

TABLE I

| Input Condition | Output Signals | | | | Feedback Control |
|---|---|---|---|---|---|
| | S1B | S2B | L1B | L2B | |
| PWM A (O1 in FIG. 3) H-L transition e.g. 20 ns before Voter | D input to DFF1 is L when Voter output changes. | DFF2 Clocks in previous short_1 state. Q = S2B = previous state | D input to DFF3 is L when Phase (node P in FIG. 1) pin | long1_bar = H causes DFF4 to reset. Qbar = L2B = H | Signal S1B = L indicates PWM A too short |

TABLE I-continued

| Input Condition | Output Signals | | | | Feedback Control |
|---|---|---|---|---|---|
| | S1B | S2B | L1B | L2B | |
| H-L transition. | Q = S1B = L | of short1_bar | goes L. Qbar = L1B = H | | for this cycle. If S1B was active the previous cycle, S2B = L (active) also. |
| PWM A H-L transition within e.g. ±15 ns of Voter H-L transition. Assuming the delay between node V and P in FIG. 1 is approximately 15 ns | D input to DFF1 is still H when Voter output changes. Q = S1B = H | short1_bar = H causes DFF2 to set. Q = S2B = H | D input to DFF3 is L when Phase pin goes L. Qbar = L1B = H | long1_bar = H causes DFF4 to reset. Qbar = L2B = H | All control signals are inactive. No feedback adjustment. |
| PWM A H-L transition e.g. 20 ns after Voter H-L transition (5 ns after node P transitions). | D input to DFF1 is still H when Voter output changes. Q = S1B = H | short1_bar = H causes DFF2 to set. Q = S2B = H | D input to DFF3 is H when Phase pin goes L. Qbar = L1B = L | DFF4 Clocks in previous long1_bar state. Qbar = L2B = previous state of long1_bar | Signal L1B = L indicates PWM A too long for this cycle. If L1B was active the previous cycle, L2B = L (active) also. |

Figure 4A:
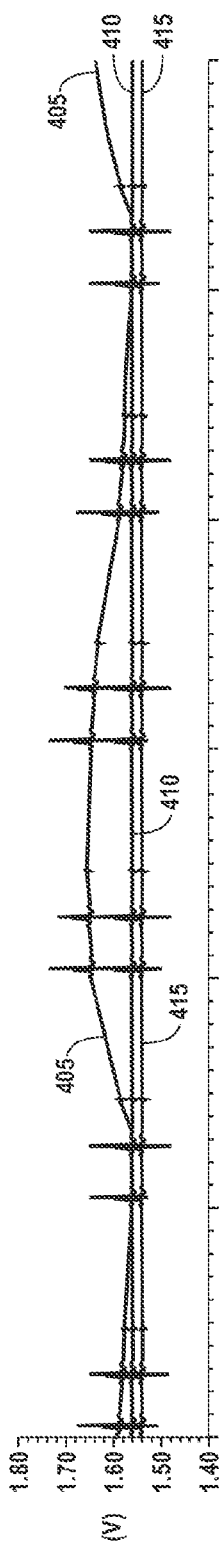
FIGS. 4A, 4B and 4C are exemplary computer simulations of a number of signals associated with a DC-DC converter having three redundant channels, in accordance with one embodiment of the present invention.
Figure 4B:
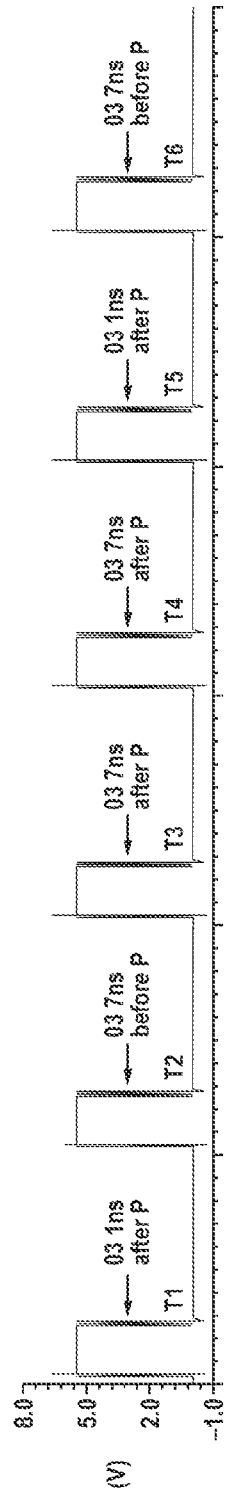
Figure 4C:
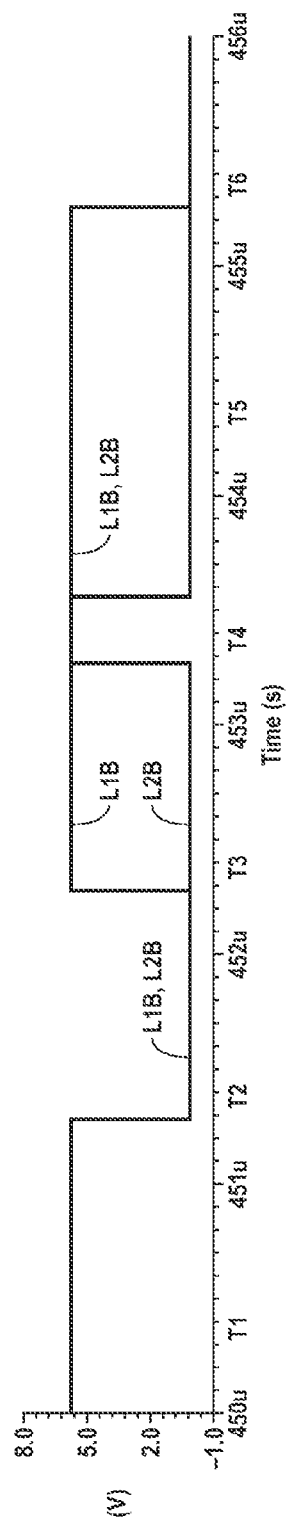

FIGS. 4A, 4B and 4C are exemplary computer simulations of a number of signals associated with the DC-DC converter of FIG. 2. Plots 405, 410 and 415 of FIG. 4A show the output signals of error amplifiers 214, 234 and 254. Error amplifier 254 is assumed to have an input offset voltage of 4 mV relative to those of error amplifiers 214 and 234. FIG. 4B shows the relative timing relationship between signals O3 and P. Signal O3 is assumed to transition 1 nsec after signal P around the times T1 and T5. Signal O3 is assumed to transition 7 nsec before signal P around the times T2 and T6. Signal O3 is assumed to transition 7 nsec after signal P around the times T3 and T4.

FIG. 4C shows the times during which output signals L1B and L2B—assumed to be active high signals in this example—of compare block 258 are asserted. Immediately after time T2, no feedback adjustment is applied. Therefore, as is seen from plot 405 of FIG. 4A, the output of error amplifier 254 is seen as diverging due to its 4 mV input offset voltage. Around the time T3, signal O3 is seen as transitioning 1ns after signal P. Therefore, signal O3 is detected as being too long thus causing signal L1B to be asserted and go high, as shown. The assertion of signal L1B causes a small correction in the feedback signal applied to error amplifier 252, thereby reducing the rate of divergence of its output voltage, as shown at time T3 in plot 405. Around the time T4, signal O3 makes a high-to-low transition 1ns after signal P. Signal O3 is thus considered to remain too long, which in turn, causes signal L1B to stay high. Since signal L1B was high the previous cycle, signal L2B also goes high around the time T4. The assertion of both signals L1B and L2B causes a relatively large correction, which in turn, causes the output of error amplifier 254 (plot 405) to start dropping back towards the outputs of amplifiers 214 and 234. Around the time T5, signal O3 is detected as occurring 1 ns after signal P, which is still considered as being too long. Therefore, signals L1B and L2B remain asserted, thereby causing a continued drop in error amplifier 254's output. Around the time T6, signal O3 is detected as occurring 7 ns before signal P. Therefore, both signal L1B and L2B are deasserted. Since no feedback signal is applied after this detection, the 4 mV input offset voltage, causes the output of error amplifier 254 to begin to diverge again, as shown in plot 405 of FIG. 4A.

Figure 5:
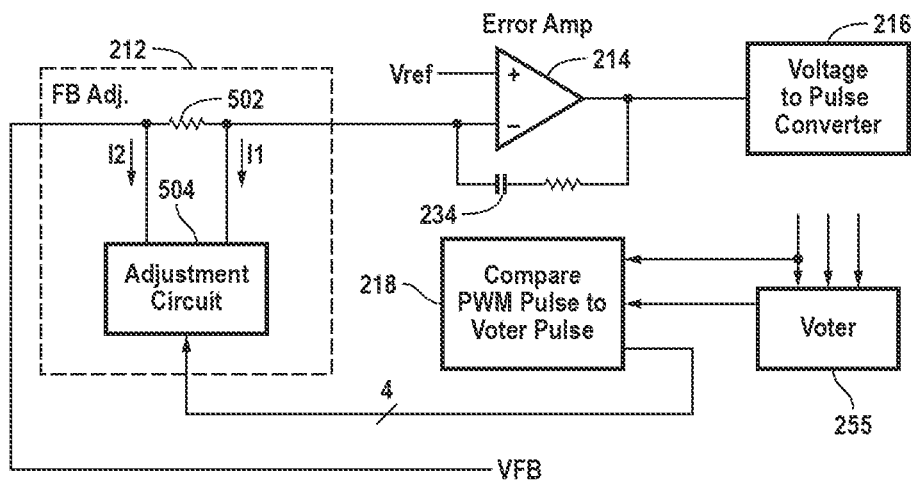
FIG. 5 is a simplified schematic diagram of the feedback adjust block in communication with the error amplifier, compare block, voltage to pulsewidth converter, and the voter disposed in the DC-DC voltage converter of FIG. 2.

FIG. 5 is a schematic diagram of feedback adjust block 212 in communication with error amplifier 214, PW compare block 218, voltage to pulsewidth converter 216, and voter 255 in accordance with one embodiment of the present invention. Although not shown, it is understood that feedback adjust blocks 232 and 252 are similar to feedback adjust block 212. Feedback adjust block 212 is shown as including an adjustment circuit 504 and a resistor 502. Adjustment circuit 504 is adapted to source (supply) current I1 to resistor 502 and sink (receive) current I2 from resistor 502. In one embodiment, currents I1 and I2 are equal. The level of currents I1 and I2 are determined by the feedback control signals S1B, S2B, L1B and L2B supplied by the associated PW compare block. For example, assume that no feedback adjustment is required thus causing currents I1 and I2 to be zero, which thereby causes the input of the error amplifier 214 to be equal to feedback voltage VFB. If a small positive adjustment is required and I1 and I2 are equal to 2 uA, the input to the error amplifier 214 is 2 mV higher than VFB. If a small negative adjustment is required and I1 and I2 are equal to −2 uA, the input to the error amplifier 214 is 2 mV smaller than VFB. In another example, assume that currents I1 and I2 are selected to be ±5 uA when a relatively larger feedback adjustment is required. This causes VFB to be adjusted by ±5 mV. The adjustment in VFB voltage is integrated by error amplifier 214 and must exceed any sources of mismatch, such as the input offset voltage of the error amplifiers, to enable the feedback circuit to operate correctly.

Table II below shows exemplary values of currents I1 and I2, the change in voltage VFB applied to the error amplifier, and the corresponding change in the associated error amplifier's output voltage for various feedback signals S1B, S2B, L1B and L2B. The two-level feedback adjustment (2 and 5 mV in this example) minimizes the ripple on the error amp output voltage. The feedback adjust signals may change during every PWM cycle.

TABLE II

| S1B | S2B | L1B | L2B | I1 | I2 | Error Amp Feedback Adjustment | Error Amp Output Change |
|---|---|---|---|---|---|---|---|
| H | H | H | H | 0 | 0 | 0 | No Change |
| L | H | H | H | −2 uA | −2 uA | −2 mV | Slow Increase |
| L | L | H | H | −5 uA | −5 uA | −5 mV | Faster Increase |
| H | H | L | H | 2 uA | 2 uA | +2 mV | Slow Decrease |
| H | H | L | L | 5 uA | 5 uA | +5 mV | Faster Decrease |

FIG. 6A shows exemplary computer simulation plots 605, 610 and 615 of the output voltages of error amplifiers 214, 234, and 254. Due to statistical variations in electrical characteristics of the components disposed therein, amplifiers 214, 234 and 254 will have different input offset voltages. Plots 620, 625, and 630, shown respectively in FIGS. 6B, 6C and 6D, depict the feedback adjust signals FB1, FB2 and FB3. Plot 640 of FIG. 6E shows the output voltage Vout of the PWM DC-DC converter.

Input offset voltages (Vio) of amplifier 254 and 234 are assumed to be 4 mV and 0.04 mV for these exemplary simulations. As is seen from FIG. 6A, because of the high input offset voltage of error amplifier 254, its output diverges (rises) quickly, as shown during the period defined by times T1 and T2. When the PW compare block 258 detects that a transition on signal O3 occurs after node P, an adjustment in the feedback signal FB3 is triggered, shown as a logic high signal for trace 630, as shown for example during the times T2. Conversely, signal FB3 is shown as a logic low when no feedback adjustment is required in channel 250.

The adjustment in signal FB3 is carried out in two steps in this example. A 2 mV adjustment is first introduced in amplifier 254 around the time T2. Because that is detected as being still insufficient (i.e., the width of pulse O3 is detected as remaining too long) during the second step, the feedback voltage applied to error amplifier 254 is adjusted by 5 mV at around the time T3. This large adjustment causes error amplifier's 254 output voltage to slowly decrease as shown in plot 615. When the falling edge of signal O3 is before the falling edge of node P, feedback signal FB3 goes low, as shown around the time T4. This causes the output of error amplifier 254 to diverge again, in turn, causing signal FB3 to be asserted. This process is repeated continuously, as shown in FIGS. 6A and 6D. Accordingly, the relatively large Vio (induced for simulation by a 4 mV dc source at the input) of error amp 254 causes its output to diverge and thus requiring frequent and longer feedback adjustment.

A smaller, e.g. 40 uV, of input offset voltage Vio is assumed for the error amp 234. This causes the output voltage of error amplifier 234 to diverge more slowly as shown in plot 610 of FIG. 6A, thus requiring infrequent and relatively smaller feedback adjustment. Accordingly, as shown in plot 625 of FIG. 6C, a single and short pulse of FB2 is applied between the times T5 and T6. For the simulations shown in FIGS. 6A-6E, error amplifier 214 is selected to control the voter's output and thus is not being adjusted. Plot 640 of FIG. 6E shows the simulated output voltage of the PWM DC-DC regulator. Output voltage Vout has a substantially normal ripple and is not affected by the two-level (e.g., 2 and 5 mV) feedback adjustments despite the highly different input offset voltages of 40 uV and 4 mV.

Figure 7A:
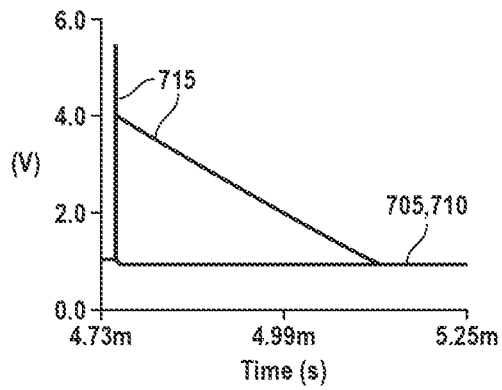
FIG. 7A shows exemplary computer simulations of the output voltages of the error amplifiers disposed in a DC-DC converter having three redundant channels, in accordance with one embodiment of the present invention.

Each redundant channel includes circuitry that is sensitive to high energy particles present in non-terrestrial applications such as satellites. Plots 705, 710 and 715 of FIG. 7A show exemplary computer simulation output voltages of three error amplifiers of a three-channel PWM DC-DC converter, such as that shown in FIG. 2. It is assumed that a single event transient (SET) occurring within redundant channel 210 results in charging of capacitor 234 (see FIG. 5) causing its immediate rise, as shown in plot 715 of FIG. 7A. Plots 705 and 710 show the error amp output voltage in the other two undisturbed redundant channels.

Figure 7B:
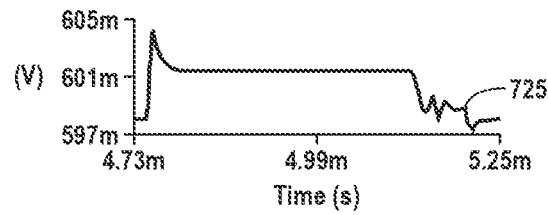
FIG. 7B shows exemplary computer simulations of the regulated output voltages of the DC-DC converter of FIG. 7A.
Figure 7C:
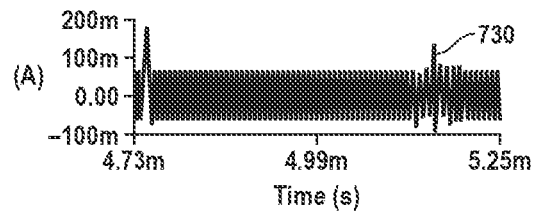
FIG. 7C shows exemplary computer simulations of the inductor current of the DC-DC converter of FIG. 7A.

The rise in the voltage across capacitor 234 is assumed to cause the output voltage of the error amplifier to exceed 5 V, thereafter gradually decaying to normal operating levels in approximately 450 us. For the simulation results shown in FIGS. 7A, 7B and 7C, it is assumed that the affected error amplifier was controlling the voter 255's output signal. Plot 725 shows the output voltage Vout of the PWM DC-DC converter which advantageously, in accordance with embodiments of the present invention, varies by less than 7 mV despite the SET. The output voltage Vout remains nearly constant at about 600 mV. Although not shown, when no channel redundancy and feedback adjust circuitry is used, similar simulations show a variation of 290 mV in Vout. Plot 730 shows the current flowing through inductor 170 (see FIG. 1) in accordance with these simulations. Although not shown, when no channel redundancy and feedback adjust circuitry is used, similar computer simulations show the inductor current spikes to greater than 1 Amp.

The above embodiments of the present invention are illustrative and not limiting. Various alternatives and equivalents are possible. The invention is not limited by the type of amplifier, voltage to pulsewidth converter, adjustment circuit, feedback adjustment levels, number of feedback adjustment levels, etc. used in the DC-DC converter. The invention is not limited to the type or the number of redundant blocks or voters. The invention is not limited by the type of integrated circuit in which the present disclosure may be disposed. Nor is the invention limited to any specific type of process technology, e.g., CMOS, Bipolar, or BICMOS that may be used to manufacture the present disclosure. Other additions, subtractions or modifications are obvious in view of the present disclosure and are intended to fall within the scope of the appended claims.

What is claimed is:

1. A DC-DC voltage regulator comprising:
   N redundant channels, N being an integer greater than one, each redundant channel comprising:
   a feedback adjust block responsive to a first feedback voltage representative of an output voltage of the DC-DC voltage regulator the feedback adjust block configured to compensate for mismatch between this channel and the other channels of the N redundant channels;

an error amplifier responsive to a reference voltage and the feedback adjust block; and a voltage-to-pulse width converter responsive to the error amplifier; and a voter responsive to each of the voltage-to-pulse width converters.

2. The DC-DC voltage regulator of claim 1 wherein each redundant channel further comprises:

a compare block adapted to compare an output of the voter to a pulse generated by an associated voltage-to-pulse width converter and to vary, in response, a second feedback voltage applied by an associated feedback adjust block.

3. The DC-DC voltage regulator of claim 2 wherein each compare block comprises:

a first flip-flop having a data input terminal responsive to an output signal of a votlage-to-pulse width converter associated with the compare block, and a clock input terminal responsive to an output of the voter;

a second flip-flop having a data input and set terminals responsive to an output signal of the first flip-flop, and a clock input terminal responsive to an output of the voter;

a third flip-flop having a data input terminal responsive to the output signal of the voltage-to-pulse width converter associated with the compare block, and a clock input terminal responsive to a transistor having a gate terminal responsive to the output of the voter; and a fourth flip-flop having a data input and reset terminals responsive to an output signal of the third flip-flop, and a clock input terminal responsive to a transistor having a gate terminal responsive to the output of the voter, said first, second, third and fourth flip-flops generating output signals defining the second feedback voltage of the compare block.

4. The DC-DC voltage regulator of claim 3 wherein each compare block further comprises:

a first buffer receiving the output signal of the voltage-to-pulse width converter associated with the compare block, said first buffer having a delay substantially matching the delay across the voter.

5. The DC-DC voltage regulator of claim 3 wherein each compare block further comprises:

a second buffer responsive to the first buffer, the data input terminal of the first flip-flop being responsive to the second buffer.

6. The DC-DC voltage regulator of claim 1 wherein each feedback adjust block comprises:

a resistive element; and an adjustment circuit adapted to source a current to and sink a current from the resistive element.

7. The DC-DC voltage regulator of claim 6 wherein the currents sourced to and sunk from the resistive element in each feedback adjust block are substantially equal.

8. The DC-DC voltage regulator of claim 1 wherein the error amplifier disposed in each redundant channel comprises a capacitor disposed across its input and output terminals.

9. The DC-DC voltage regulator of claim 1 wherein said N is an odd integer.

10. A DC-DC voltage regulator comprising:

N redundant channels, N being an integer greater than one, each redundant channel comprising:

a feedback adjust block responsive to a first feedback voltage representative of an output voltage of the DC-DC voltage regulator, the feedback adjust block configured to compensate for one or more mismatches between the redundant channel and the other redundant channels of the N redundant channels;

an amplifier responsive to a reference voltage and the feedback adjust block;

a voltage-to-pulse width converter responsive to the error amplifier;

a voter responsive to each of the voltage-to-pulse width converters; and wherein said voter is a majority voter.

11. A method of regulating a DC voltage, the method comprising:

generating a pulse-width modulated signal in each of N redundant channels, N being an integer greater than one;

applying the N pulse-width modulated signals to a voter having an output signal defining a regulated DC output voltage;

generating a feedback voltage representative of the regulated DC output voltage; and varying a width of at least one of the pulse-width modulated signals in accordance with the feedback voltage signal;

further comprising:

comparing each of the pulse-width modulated signals to an output signal of the voter to generate N feedback signals;

adjusting the feedback voltage applied to at least one of the redundant channels in accordance with the redundant channel's associated feedback signal if the pulse-width modulated signal associated with the at least one of the redundant channels is detected as having a pulse width different from the voter output's pulse width by a predefined value;

amplifying a difference between a reference voltage and the adjusted feedback voltage to generate a first error voltage; and varying the width of the pulse of the pulse-width modulated signal in the at least one of the redundant channels in accordance with the first error voltage.

12. The method of claim 11 wherein the feedback signal associated with each redundant channel comprises at least four signals, the method further comprising:

increasing the pulse width of the pulse-width modulated signal associated with at least one of the redundant channels by a first amount in response to a first one of the four associated feedback signals;

increasing the width of the pulse-width modulated signal associated with at least one of the redundant channels by a second amount in response to a second one of the four associated feedback signals;

decreasing the width of the pulse-width modulated signal associated with at least one of the redundant channels by a third amount in response to a third one of the four associated feedback signals; and decreasing the width of the pulse-width modulated signal associated with at least one of the redundant channels by a fourth amount in response to a fourth one of four associated feedback signals.

13. The method of claim 12 wherein said first amount is equal to said third amount and said second amount is equal to said fourth amount.

14. The method of claim 11 further comprising for each redundant channel:

delaying the associated pulse-width modulated signal by a first amount substantially matching the delay across the voter.

15. The method of claim 14 further comprising for each redundant channel:

delaying the delayed associated pulse-width modulated signal by a second amount defining a window.

16. The method of claim 11 wherein adjusting the feedback voltage comprises:
   supplying a first current to a resistive element;
   receiving a second current from the resistive element; and
   adjusting the feedback voltage in accordance with a voltage drop across the resistive element.

17. The method of claim 16 wherein the first and second currents are substantially equal.

18. The method of claim 11 wherein said N is an odd integer.

19. The method of claim 11 wherein said voter is a majority voter.

20. A method of regulating a DC voltage, the method comprising:
   generating a pulse-width modulated signal in each of N redundant channels, N being an integer greater than one;
   applying the N pulse-width modulated signals to a voter having an output signal defining a regulated DC output voltage;
   generating a feedback voltage representative of the regulated DC output voltage;
   in each of the N redundant channels,
      adjusting the feedback voltage to compensate for mismatches between the N redundant channels,
      comparing the adjusted feedback voltage with a reference voltage;
      generating the pulse-width modulated signal based on the comparison.

* * * * *